United States Patent
Saito

(10) Patent No.: US 11,885,001 B2
(45) Date of Patent: Jan. 30, 2024

(54) MANUFACTURING METHOD OF METAL MEMBER WITH RESIDUAL STRESS

(71) Applicant: SINTOKOGIO, LTD., Nagoya (JP)

(72) Inventor: Yuta Saito, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 0 days.

(21) Appl. No.: 17/957,295

(22) Filed: Sep. 30, 2022

(65) Prior Publication Data

US 2023/0103386 A1   Apr. 6, 2023

(30) Foreign Application Priority Data

Oct. 5, 2021   (JP) .................. 2021-163888

(51) Int. Cl.
    *C22F 1/04*   (2006.01)
(52) U.S. Cl.
    CPC ..................... *C22F 1/04* (2013.01)
(58) Field of Classification Search
    CPC ........................................................ C22F 1/04
    See application file for complete search history.

(56) References Cited

FOREIGN PATENT DOCUMENTS

| | | |
|---|---|---|
| EP | 2682493 A1 | 1/2014 |
| JP | H05-179411 A | 7/1993 |
| JP | 2015-121262 A | 7/2015 |
| WO | WO-2012/133885 A1 | 10/2012 |

OTHER PUBLICATIONS

Shirai Kazuhiko et al. [JPH05179411A](Machine translation) (Year: 1993).*
P. Peyre, et al. ["Laser shock processing of aluminum alloys. Application to high cycle fatigue behavior", Materials Science and Engineering A210 (1996) 102-113]. (Year: 1996).*
Kulekci, Mustafa Kemal et al., "Critical analysis of processes and apparatus for industrial surface peening technologies," The International Journal of Advanced Manufacturing Technology, Springer, London, vol. 74, No. 9, Jul. 4, 2014, pp. 1551-1565, XP035403420.

* cited by examiner

*Primary Examiner* — Brian D Walck
*Assistant Examiner* — Nazmun Nahar Shams
(74) *Attorney, Agent, or Firm* — Faegre Drinker Biddle & Reath LLP

(57) ABSTRACT

A manufacturing method according to one aspect includes performing a first process of refining crystal grains of the metal member, performing a second process of releasing residual stress of the metal member after the first process, and performing a third process of applying residual stress to the metal member after the second process.

8 Claims, 3 Drawing Sheets

MANUFACTURING METHOD OF METAL MEMBER WITH RESIDUAL STRESS

CROSS-REFERENCE TO RELATED APPLICATIONS

This application is based on and claims the benefit of priority from Japanese Patent Application No. 2021-163888 filed on Oct. 5, 2021, the entire contents of which are incorporated herein by reference.

TECHNICAL FIELD

The present disclosure relates to a manufacturing method of a metal member with residual stress.

BACKGROUND

A technique to apply residual stress to a metal member in order to improve fatigue strength and the like of the metal member is known. For example, Patent Literature 1 describes that a suspension spring mounted on an automobile is subjected to laser peening or the like to apply compressive residual stress to the inside of the suspension spring, and then the suspension spring is subjected to shot peening to apply compressive residual stress to a surface of the suspension spring. By introducing compressive residual stress into the suspension spring over a certain depth from the surface of the suspension spring, it is possible to maintain the fatigue strength of the suspension spring when corrosion occurs on the surface of the suspension spring.

PRIOR ART DOCUMENT

Patent Literature

Patent Literature 1: Japanese Patent Application Laid-Open Publication No. 2015-121262

SUMMARY

As described above, residual stress is applied to a metal member by performing the peening process on the metal member. The residual stress applied to the metal member is released as time elapses and is gradually weakened. In particular, in an aluminum alloy, a beta phase compound is precipitated as time elapses, and strain inside the aluminum alloy is released when the beta phase compound is precipitated. Therefore, the residual stress of the aluminum alloy is easily released over time. If the residual stress of the metal member is released over time, the fatigue strength of the metal member is reduced.

Therefore, an object of the present disclosure is to provide a manufacturing method of a metal member in which residual stress is not easily released.

In one aspect, A manufacturing method of a metal member with residual stress is provided. The manufacturing method includes performing a first process of refining crystal grains of the metal member, performing a second process of releasing residual stress of the metal member after the first process, and performing a third process of applying residual stress to the metal member after the second process.

In the method according to one aspect, the crystal grains of the metal member are refined by the first process. Here, since the reliability in the X-ray residual stress measurement for the metal member depends on the number of crystals of the metal member, it is possible to increase the reliability in the X-ray residual stress measurement for the metal member by refining the crystal grains of the metal member to increase the number of crystals. By performing the second process and the third process after the first process, the residual stress can be effectively applied to the metal member and the release of the residual stress can be relatively suppressed.

According to the present disclosure, it is possible to manufacture a metal member in which residual stress is not easily released.

DETAILED DESCRIPTION

Figure 1:
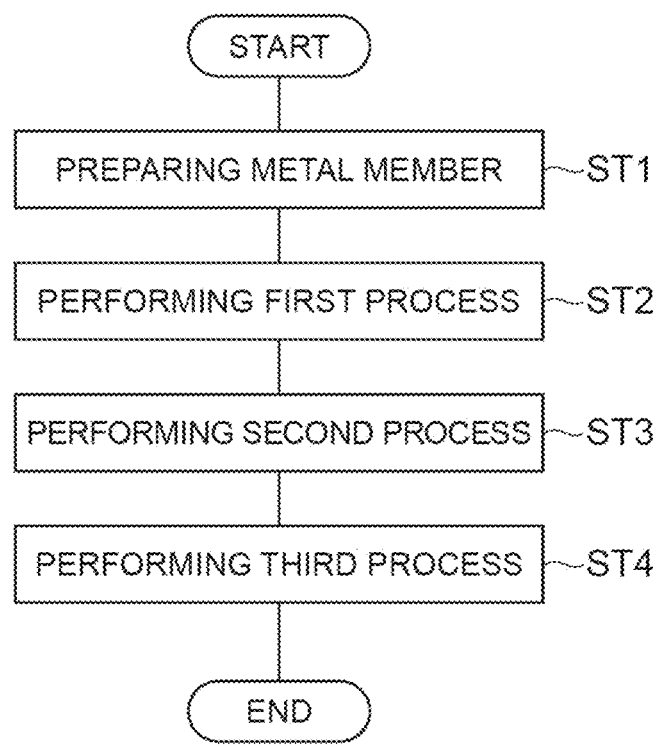
FIG. 1 is a flowchart illustrating a manufacturing method of a metal member according to one embodiment.

Hereinafter, embodiments of the present disclosure will be described with reference to the drawings. In the following description, the same elements or elements having the same functions are denoted by the same reference numerals, and redundant description will be omitted.

In one embodiment, a metal member with residual stress is manufactured. Examples of the metal member to be manufactured include metal parts which require high fatigue strength and wear resistance, such as automobile parts, railroad parts or aircraft parts. Examples of materials of the metal member include, but are not limited to, an alloy containing iron as a main component, such as steel, and an aluminum alloy. For example, the metal member may be made of an aluminum alloy that precipitates a beta phase compound. Examples of the aluminum alloy from which the beta phase compound is precipitated include an aluminum alloy containing at least one element selected from Mg (magnesium), Cu (copper) and Mn (manganese).

In this type of aluminum alloy, in the aging step in an isothermal state, a plate-like stable phase precipitate (beta phase) is precipitated through a supersaturated solid solution, an acicular zone, and a rod-like precipitate in this order. The total volume of the precipitated beta phase is reduced from that of the supersaturated solid solution. When the energy generated by the reduction of the total volume is defined as E, and the energy for the precipitation of the beta phase, that is, the generation of a new phase is defined as G, G>E is satisfied. By applying heat energy H, G=E+H is obtained. By using strain energy ΔG inside the material as a substitute for H, the beta phase is precipitated even in a room temperature. When the content (total content) of Mg, Cu and Mn is at least 0.2% or more, a beta phase compound is produced.

Residual stress may be applied to the metal member by the peening process. By applying the residual stress to the metal member, the fatigue strength of the metal member is improved. However, the residual stress applied to the metal member is gradually released over time. In particular, when the metal member is made of an aluminum alloy containing elements such as Mg, Cu and Mn, the beta phase compound is formed on the strain introduced into the metal member by a reaction between these elements and aluminum. At this time, the strain of the metal member is released and the residual stress is weakened. Hereinafter, a manufacturing method of the metal member in which the residual stress is not easily released will be described.

FIG. 1 is a flowchart illustrating a manufacturing method of a metal member according to one embodiment. As shown in FIG. 1, in the manufacturing method of the metal member according to one embodiment, the metal member is prepared as a workpiece (step ST1).

The metal member prepared in the step ST1 is, for example, an aluminum alloy member containing Mg, Cu, or Mn. More specifically, the metal member may be a wrought aluminum alloy or a cast aluminum alloy. The aluminum alloy member may be a bulk body that has been previously subjected to a thermal refining process such as annealing. The metal member may be made of a metal material other than an aluminum alloy, such as steel, as long as the residual stress is released over time.

Next, a first process of refining the crystal grains of the prepared metal member is performed (step ST2). Examples of the first process include, but are not limited to, shot peening, equal-channel angular pressing (ECAP), high-pressure torsion (HPT), and cold forging. According to these methods, the crystal grains of the metal member can be refined by changing the crystal structure by plastic deformation of the metal member. For example, the shot peening process is a method of applying a compressive residual stress to the surface of the metal member by projecting shot media to collide with the metal member. When the surface of the metal member is plastically deformed by the collision of the shot media, the crystal grains in the surface layer portion of the metal member are refined.

As the shot peening process, an air type shot peening process in which the shot media are projected by compressed air and an impeller type shot peening process in which the shot media are projected by centrifugal force of an impeller rotating at high speed are known. As the shot media, for example, zirconia, glass or steel projectiles are utilized. The diameter of the projectiles may be, for example, 20 μm or more and 2000 μm or less. The hardness of the shot media may be, for example, 250 HV or more and 700 HV or less.

When air type shot peening is employed as the first process, the injection pressure of compressed air may be set to, for example, 0.05 MPa or more and 1 MPa or less. When impeller type shot peening is employed as the first process, the rotation speed of the impeller may be set to, for example, 20 m/s or more and 150 m/s or less. The coverage of the shot peening may be, for example, 80% or more and 500% or less. The conditions of the shot peening are appropriately set according to the material of the metal member.

As described above, since the surface of the metal member is plastically deformed by the first process, the crystal grains of the metal member are refined. The grain size of the refined crystal grains may be, for example, 5 nm or more and 50 nm or less, and may be 5 nm or more and 20 nm or less. The refined crystal grains exist in a depth range of, for example, 50 μm or less from the surface of the metal member. As the crystal grains of the metal member are refined, the number of crystals of the metal member increases. Since the amount of strain that can be introduced into the metal member depends on the number of crystals, the first process increases the residual stress that can be introduced into the metal member by refining the crystal grains of the metal member.

In one embodiment, the compressive residual stress applied to the metal member may be measured by the X-ray residual stress measurement after the first process is performed and before a second process described below. For example, by confirming that continuous Debye rings are generated, it is confirmed that a certain number or more of crystal grains are present within the measurement range of the X-ray residual stress measurement.

After the first process, a second process is performed to release the residual stress of the metal member in which the crystal grains are refined (step ST3). The second process may release the residual stress of the metal member while maintaining a state in which crystal grains are refined in the first process. The second process is, for example, a thermal refining process in which the metal member is held at a temperature of 125° C. or more and 170° C. or less for one hour or more, and then cooled to room temperature. The formation of the beta phase compound is accelerated by heating the aluminum alloy in a temperature range of 125° C. or higher. The recrystallization temperature of the aluminum alloy is 180° C. Therefore, by heating the metal member at a temperature of 125° C. or more and 170° C. or less, the residual stress of the metal member can be released while suppressing the recrystallization of the metal member.

In the second process, the time (heat treatment time) for which the metal member is held at a temperature of 125° C. or more and 170° C. or less is at least 1 hour or more, and preferably 6 hours or more. By heating the metal member for one hour or more, the residual stress of the metal member can be released without significantly changing the crystal grain diameter of the metal member. Further, since the second process promotes the formation of the beta phase compound, formation of the beta phase compound is suppressed after the second process. Thus, the release of the residual stress of the metal member over time is suppressed.

The heat treatment time of the second process may be 72 hours or less, 48 hours or less, or 24 hours or less. By setting the heat treatment time to 72 hours or less, recrystallization of the metal member can be reliably suppressed, and the metal member can be manufactured with high productivity. Further, once the residual stress of the metal member is released in the second process, the introduction of the residual stress into the metal member is promoted in a third process described later.

In one embodiment, the second process described above is performed using a device capable of maintaining a constant temperature, such as a drying furnace or a muffle furnace. The second process is performed until, for example, full width at half maximum (FWHM) of the diffracted X-ray peak of the metal member changes by 0.1 deg or more, preferably 0.2 deg or more before and after the thermal refining process. Further, the second process is performed such that the variation (absolute value) between the residual stress of the metal member within 24 hours after the thermal refining process and the residual stress of the metal member after 24 hours after the thermal refining process is equal to or less than 50 MPa. Accordingly, the residual stress of the metal member is prevented from being released over time after the thermal refining process.

In one embodiment, the compressive residual stress applied to the metal member may be measured by the X-ray residual stress measurement after performing the second process and before performing the third process. For example, by confirming that continuous Debye rings are generated, it is confirmed that a certain number or more of crystal grains are present within the measurement range of the X-ray residual stress measurement.

After the second process, a third process of applying the residual stress to the metal member is performed (step ST4). The third process is a process different from the first process. Examples of the third process include, but are not limited to, laser peening, cavitation peening, water jet peening, and low plasticity burnishing (LPB). Unlike the first process, the third process is able to apply the residual stress to the metal member without significantly changing the crystal structure of the metal member. For example, the shot peening process deforms the crystal grains themselves of the metal member, whereas the laser peening process does not change the crystal grains of the metal member but changes the interstitial distance of the crystal. That is, both of the shot peening process and the laser peening process are processes of applying the residual stress to the metal member, but the generation mechanisms of the residual stress of both processes are different.

Figure 2:
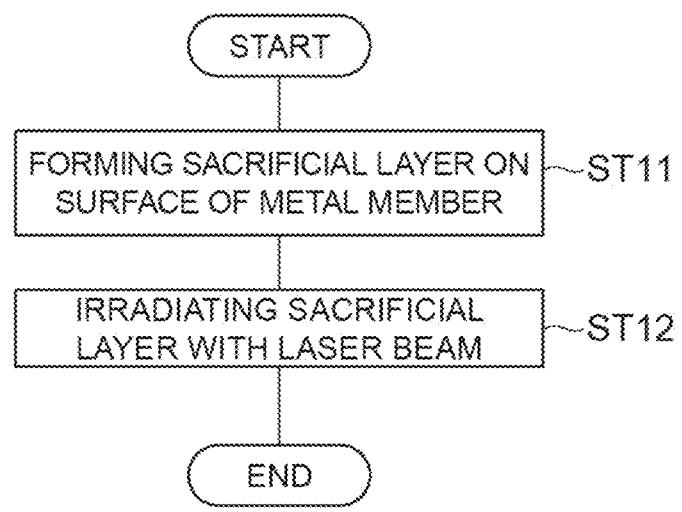
FIG. 2 is a flowchart illustrating a laser peening process.

FIG. 2 is a flowchart illustrating the flow of processing when laser peening is employed as the third process. As shown in FIG. 2, when laser peening is performed on the metal member, a sacrificial layer is formed on a surface of the metal member that has been subjected to the first processed to protect the surface of the metal member (step ST11). As the sacrificial layer, for example, a black film tape is used. Next, the sacrificial layer is irradiated with laser beam using a laser peening apparatus (step ST12). At this time, as the laser beam applied to the metal member, a pulse laser having a power density for generating laser ablation is used.

When the sacrificial layer attached to the surface of the metal member is irradiated with the laser beam, the sacrificial layer is turned into plasma and a shock wave is induced. When the shock wave propagates through the metal member, the residual stress is applied to the metal member. At this time, since the residual stress is released from the metal member by the second process, the residual stress is effectively introduced into the metal member by the third process. By irradiating the sacrificial layer with the laser beam in this manner, the residual stress can be applied to the metal member with high uniformity while suppressing damage to the surface of the metal member. When the laser peening is performed, the metal member may be irradiated with the laser beam in a state in which the metal member is disposed in water or in a state in which a water film is formed on the surface of the metal member.

In one embodiment, the sacrificial layer may not be formed on the surface of the metal member, and the surface of the metal member on which the first process has been performed may be directly irradiated with the laser beam. Even when the surface of the metal member is directly irradiated with the laser beam, the compressive residual stress can be applied to the metal member.

As described above, in the manufacturing method of a metal member according to an embodiment, the metal member to which the compressive residual stress is applied may be manufactured by sequentially performing the first process, the second process, and the third process. More specifically, since the reliability in the X-ray residual stress measurement for the metal member depends on the number of crystals of the metal member, it is possible to increase the reliability of the X-ray residual stress measurement for the metal member by refining the crystal grains of the metal member by the first process to increase the number of crystals. By performing the second process and the third process after the first process, the residual stress can be effectively applied to the metal member. Meanwhile, since the amount of Mg, Cu, or Mn contained in the metal member is constant, the release of the residual stress may be relatively suppressed. Therefore, the metal member manufactured as described above has a property in which the compressive residual stress is not easily released.

Although the manufacturing method of the metal member according to various embodiments has been described above, the present invention is not limited to the above-described embodiments, and various modifications can be made without departing from the scope of the present invention.

For example, although an example in which the metal member is made of an aluminum alloy has been described in the above-described embodiment, the metal member may be made of a metal material other than an aluminum alloy. An aluminum alloy has a property that release of the compressive residual stress easily proceed due to generation of the beta phase compound. However, the compressive residual stress is released over time also in a metal material other than an aluminum alloy such as steel. Even with these materials, the metal member in which the residual stress is less likely to be released can be manufactured by sequentially performing the first process, the second process, and the third process described above.

Next, effects of the above-described manufacturing method of the metal member will be described based on examples and comparative examples, but the present invention is not limited to the following examples.

First, in Example 1, a sample made of a wrought aluminum alloy specified by JIS (Japanese Industrial Standards) A7075 was prepared. Next, a shot peening process was performed on this sample as a first process. Shot media made of steel (particle size: 0.10 mm) was used as shot media for the shot peening process. The conditions of the shot peening process were as follows.

(Conditions of the Shot Peening Process)
Injection pressure: 0.2 MPa
Shot media injection amount: 9.0 kg/min
Coverage: 300%
Arc height: 0.118 mA Next, in Example 1, as a second process, the sample subjected to the shot peening process was heated at 150° C. for 6 hours and then cooled to room temperature. This released the compressive residual stress of the sample without recrystallizing the crystal grains.

Thereafter, a laser peening process was performed as a third process on the sample in which the compressive residual stress was released to apply the compressive residual stress to the sample. The conditions of the laser peening process were as follows.

(Conditions of the Laser Peening Process)
Spot size of laser beam: 0.4 mm
Power density: 12 GW/cm$^2$
Pulse energy: 100 mJ
Irradiation density: 56 Pulses/mm$^2$ In contrast, in Comparative Example 1, only the shot peening process was performed on the same sample as in Example 1. The conditions of the shot peening process in Comparative Example 1 were the same as the conditions of the shot peening process of Example 1. In Comparative Example 2, only the laser peening process was performed on the same sample as in Example 1. The conditions of the laser peening process in Comparative Example 2 were the same as the conditions of the laser peening process of Example 1. The residual stress of the samples obtained in Example 1, Comparative Example 1, and Comparative Example 2 was measured. For measurement of residual stresses, an X-ray residual stress measurement apparatus µ-X360s manufactured by Pulstec Industrial Co., Ltd. was used.

Figure 3:
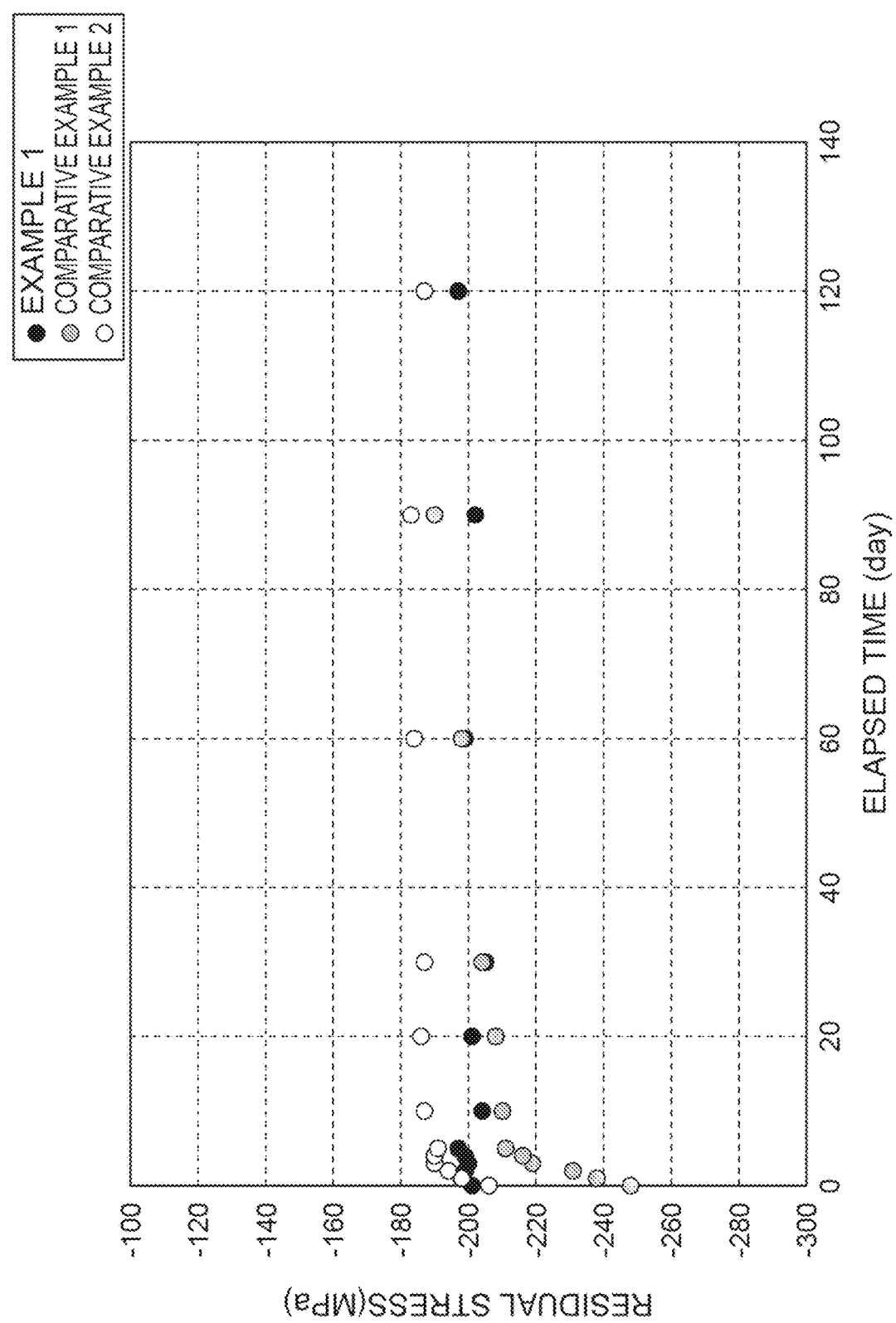
FIG. 3 is a graph illustrating temporal changes in residual stress of a metal member.

FIG. 3 is a graph illustrating temporal changes in residual stress of the samples obtained in Example 1, Comparative Example 1, and Comparative Example 2. The vertical axis of the FIG. 3 represents the residual stress of the samples, and the horizontal axis represents time (days). In FIG. 3, a tensile residual stress is expressed as a positive value, and a compressive residual stress is expressed as a negative value.

As shown in FIG. 3, the sample of Comparative Example 1 exhibited a residual stress of −250 Mpa immediately after the shot peening process, but the residual stress changed to −210 Mpa by 10 days after the shot peening process. That is, the compressive residual stress of the sample of Comparative Example 1 was released over time. In addition, the compressive residual stress of the sample of Comparative Example 1 was released even after 10 days from the shot peening process and changed to −190 Mpa after 120 days.

The residual stress of the sample of Comparative Example 2 exhibited −210 Mpa immediately after the laser peening process, but the residual stress changed to −190 Mpa by 10 days after the laser peening process. That is, it was confirmed that the compressive residual stress of the sample of Comparative Example 2 was also released over time.

In contrast, it was confirmed that the residual stress of the sample of Example 1 was kept constant around −200 MPa over 120 days. From this result, it was confirmed that the compressive residual stress was not easily released in the sample manufactured in Example 1.

What is claimed is:

1. A manufacturing method of a metal member with residual stress, the manufacturing method comprising:
    plastically deforming the metal member to refine crystal grains of the metal member;
    heating the metal member so as to maintain the refined state of the crystal grains to release residual stress of the metal member after the crystal grains of the metal member are refined; and
    performing a laser peening, a cavitation peening, a water jet peening, or a low plasticity burnishing (LPB) to apply residual stress to the metal member after the the metal member is heated.

2. The manufacturing method according to claim 1, wherein the metal member is made of an aluminum alloy containing Mg, Cu or Mn.

3. The manufacturing method according to claim 1, wherein is a shot peening process is performed to refine crystal grains of the metal member.

4. The manufacturing method according to claim 1, wherein is a laser peening process is performed to apply residual stress to the metal member.

5. The manufacturing method according to claim 4, wherein the laser peening process includes:
    forming a sacrificial layer for protecting a surface of the metal member on the surface of the metal member; and
    irradiating the sacrificial layer with a laser beam.

6. The manufacturing method according to claim 1, wherein the metal member is heated at a temperature of 125° C. or more and 170° C. or less for 6 hours or more to release residual stress of the metal member.

7. The manufacturing method according to claim 1, wherein the metal member is heated at a temperature lower than recrystallization temperature of the metal member to release residual stress of the metal member.

8. The manufacturing method according to claim 1, wherein the metal member is heated at a temperature of 125° C. or more and 170° C. or less for 1 hour or more and 72 hours or less to release residual stress of the metal member.

* * * * *